(12) United States Patent
Wada

(10) Patent No.: US 7,009,776 B2
(45) Date of Patent: Mar. 7, 2006

(54) PROJECTION OPTICAL SYSTEM AND PROJECTION APPARATUS USING THE SAME

(75) Inventor: Ken Wada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 10/288,315

(22) Filed: Nov. 5, 2002

(65) Prior Publication Data

US 2003/0103266 A1    Jun. 5, 2003

(30) Foreign Application Priority Data

Nov. 5, 2001 (JP) .............................. 2001-339337

(51) Int. Cl.
G02B 9/00 (2006.01)
G02B 15/14 (2006.01)

(52) U.S. Cl. ........................ 359/649; 359/676; 359/754

(58) Field of Classification Search ........ 359/649–651, 359/754, 676
See application file for complete search history.

(56) References Cited

U.S. PATENT DOCUMENTS

| | | | |
|---|---|---|---|
| 4,387,970 A * | 6/1983 | Brueggemann | 359/754 |
| 5,355,188 A * | 10/1994 | Biles et al. | 353/69 |
| 5,820,240 A | 10/1998 | Ohzawa | |
| 5,986,806 A | 11/1999 | Sugawara | |
| 6,123,425 A | 9/2000 | Ohzawa | |
| 6,452,727 B1 | 9/2002 | Okuyama | |

2003/0007138 A1 *  1/2003  Shigematsu et al. .......... 355/67

FOREIGN PATENT DOCUMENTS

| | | |
|---|---|---|
| JP | 4346309 | 12/1992 |
| JP | 07-287190 | 10/1995 |
| JP | 9-304732 | 11/1997 |
| JP | 09-304733 | 11/1997 |
| JP | 10-133101 | 5/1998 |
| JP | 10-186235 | 7/1998 |
| JP | 10186235 | 7/1998 |
| JP | 10-206791 | 8/1998 |
| JP | 10-268193 | 10/1998 |
| JP | 10-282451 | 10/1998 |
| JP | 10268193 | 12/1999 |
| JP | 2000-147376 | 5/2000 |
| JP | 2001-141994 | 5/2001 |

OTHER PUBLICATIONS

An office action from the Patent Office of the People's Republic of China dated Mar. 5, 2004 for Application No. 02147995.X with English Translation.

* cited by examiner

Primary Examiner—Scott J. Sugarman
(74) Attorney, Agent, or Firm—Morgan & Finnegan, L.L.P.

(57) ABSTRACT

An object is to obtain a projection optical system capable of projecting image information onto a screen while maintaining satisfactory optical performance, and projection apparatus using it. An image display element and the screen both are set normal to the reference optical axis of the projection optical system, and at least one optical element out of a plurality of optical elements constituting the projection optical system has an optical axis shifted from the reference optical axis or/and tilted relative to the reference optical axis.

22 Claims, 14 Drawing Sheets

PROJECTION OPTICAL SYSTEM AND PROJECTION APPARATUS USING THE SAME

BACKGROUND OF THE INVENTION

1. Field of the Invention

The present invention relates to a projection optical system and projection apparatus using the same and, particularly, is suitably applicable, for example, to liquid crystal projectors with a fixed shift mechanism for magnifying and projecting image information based on a liquid crystal element, onto a screen surface located above the projection optical axis.

2. Related Background Art

The liquid crystal projectors (projection apparatus) for projecting image information based on a liquid crystal display device (liquid crystal panel, LCD), onto a predetermined surface have widely been used heretofore for conferences, presentations, etc., for example, as apparatus capable of presenting a projected image from a personal computer or the like on a large screen.

Under such circumstances the projection optical system for the liquid crystal projectors is demanded to achieve a short distance from the screen to the apparatus and to project the magnified, projected image to a possibly highest position, i.e., upward. One of methods for upward projection is a method of intentionally shifting and fixing the center of the liquid crystal display device from the optical axis of the projection optical system (so called a shift projection optical system), thereby magnifying and projecting the image, mainly, to the upper side of the optical (reference) axis of the projection optical system as to the magnification-side conjugate (screen) surface.

Namely, as shown in FIG. 14, concerning the demagnification-side conjugate surface, the liquid crystal display device is shifted and fixedly positioned so that the center of the liquid crystal display device LCD is located mainly on the lower side of the optical (reference) axis La of the projection optical system PL. For this reason, there are many cases where only an approximately half region (on the lower side) of an original, effective image circle (effective field) of the projection optical system PL, which is indicated by hatching in the drawing, is used.

FIG. 14 is a view from the R channel out of R (red), G (green), and B (blue) channels.

In general, in the case of large-scale liquid crystal projectors and the like for implementing superimposed projection of two or more projected images on a screen through the use of a plurality of liquid crystal projectors like two or three projectors, there are cases where a shift amount of the liquid crystal display device is variable. However, the shift mechanism of the liquid crystal display device is used in a fixed state, particularly, in the compact and lightweight liquid crystal projectors using the 0.9-inch or smaller liquid crystal display device, or rather, the fixed shift mechanism is adopted for compact and lightweight structure, in order to avoid enlargement and complexity of the set with the variable shift mechanism.

Besides, another means for upward projection is a projection method of obliquely tilting the projection optical system relative to the screen.

On that occasion trapezoid distortion and image inclination occurs due to an angle of inclination between the screen surface and the optical (reference) axis of the projection system and a projection apparatus correcting them with an optical system is proposed, for example, in Japanese Patent Application Laid-Open No. 9-304732.

In recent years, with increase in the number of pixels of the liquid crystal display device or the like, there are desires for a bright, large-aperture projection optical system that has high resolution and that can be used even under bright fluorescent lamps and under daylight. On the other hand, there are strong desires for compact and lightweight projectors of 5 pounds or less using the compact liquid crystal display device.

For meeting the desires, high-resolution and compact zoom lenses consisting of four or five lens units are recently proposed as projection lenses (projection optics) for the liquid crystal projectors, for example, in Japanese Patent Applications Laid-Open No. 10-186235, Laid-Open No. 10-268193, and so on.

The trapezoid distortion appears in the projected image in the case where the image display element (liquid crystal display device) is used with a shift relative to the optical axis of the projection optical system or in the case where the projection optical system is used with a tilt of the optical axis relative to the screen. Even in the case where the optical axis of the projection apparatus is not tilted relative to the screen, the center of the image display element disagrees with the optical axis and thus the projection optical system is used in an asymmetric manner with respect to the optical axis, which causes the image to be projected in a distorted state, for example, if distortion aberration remains in the projection optical system.

Japanese Patent Application Laid-Open No. 9-304732 discloses the means for optically correcting the trapezoid distortion and image inclination in the upward projection in the liquid crystal projector, but it is difficult to apply the means to a vari-focal (zoom) optical system as it is, because it raises complexity in shapes of lenses and lens surfaces constituting the projection optical system and forces considerable loads on processing.

In general, for making the projection optical system brighter and higher in resolution, it is necessary to properly set the lens configuration of each lens, in order to search for a configuration enabling high resolution while maintaining a large full-open pupil diameter.

Without proper setting of the lens configuration of each lens unit, for example, though the entire optical system can be constructed in compact scale, movement of the lens units will become complex during the zoom operation and the entire projection apparatus will become complex, for example, because of increase in the number of lens barrels.

SUMMARY OF THE INVENTION

An object of the present invention is to provide a projection optical system capable of upwardly projecting the image information onto the screen while simplifying the entire apparatus and maintaining high optical performance, and projection apparatus using the projection optical system.

In view of the above object, an aspect of the present invention is a projection optical system for magnifying and projecting image information formed on an image display element, onto a projection surface, comprising:

a plurality of optical elements, wherein the image display element and the projection surface both are set substantially normal to a reference optical axis of the projection optical system and wherein at least one optical element out of the plurality of optical elements has an optical axis shifted from the reference optical axis and/or tilted relative to the reference optical axis.

In the above-stated projection optical system, preferably, the following condition is met:

$0.45 < dya/Ya < 0.75$, where dya is a deviation amount of a center of the image display element from the reference optical axis in a direction of gravity and Ya an effective width of the image display element in the direction of gravity.

Preferably, the above-stated projection optical system comprises the following lens units in the order stated from the magnification side: a first lens unit with a negative refracting power; a second lens unit with a positive refracting power; a third lens unit with a positive refracting power; a fourth lens unit with a negative refracting power; and a fifth lens unit with a positive refracting power, wherein two or more lens units are moved during a zoom operation and the first lens unit and the fifth lens unit are fixed during the zoom operation, wherein the second lens unit comprises a lens with a positive refracting power and a lens with a negative refracting power, and wherein each of the foregoing lenses has an optical axis shifted from the reference optical axis in the direction of gravity.

Furthermore, a projection apparatus according to the present invention comprises the aforementioned projection optical system; and an illumination optical system for illuminating the image display element with light from a light source.

DETAILED DESCRIPTION OF THE PREFERRED EMBODIMENTS

In the embodiments, the projection optical system is comprised of a plurality of optical elements and is configured to magnify and project an image on the reduction-side surface out of two conjugate surfaces (a screen surface and an image display surface), onto the screen surface (projection surface); the two conjugate surfaces are set substantially normal to the reference optical axis of the projection optical system (the reference optical axis is an axis connecting centers of a majority of optical elements or all of the optical elements of the projection optical system), and at least one optical element out of the optical elements constituting the projection optical system has a center fixed with a deviation from the reference optical axis of the projection optical system; the reference optical axis of the projection optical system is fixed with a deviation from the center of the reduction-side conjugate surface. Namely, noting the point that the conventional projection optical system for the liquid crystal display apparatus as described above with reference to FIG. 14 is the asymmetric optical system having the effective area only on the lower side from the reference optical system of the projection optical system on the reduction-side conjugate surface, various aberrations are canceled as to the effective area by intentionally letting (asymmetric) optical decentering act in the optical system so as to positively add decentering aberration to residual aberration posing a problem in coaxial optics.

The magnification-side image can be projected upward, as described previously, as long as the reference optical axis of the projection optical system deviates from the center of the conjugate surface in the gravitational (vertical) direction. Since in this system the symmetry is reserved in the lateral (horizontal) direction with respect to the center of the conjugate surface, the decentering aberration can be made to positively act on the effective area where the liquid crystal display device is placed, while the lateral symmetry is reserved, if the center axis of the decentered optical element forming the projection optical system is fixed with decentration in the direction of gravity, which is the same direction with asymmetry, from the reference optical axis of the projection optical system.

Figure 14:
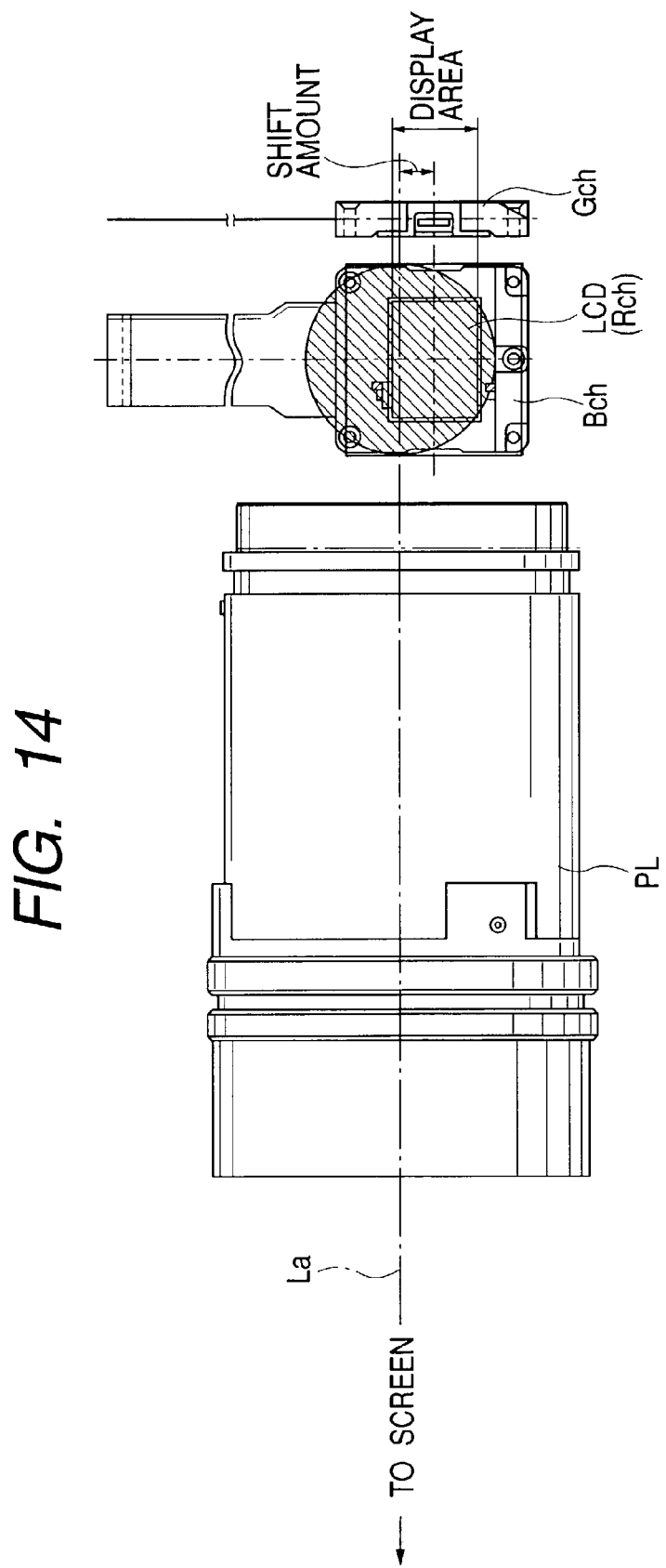
FIG. 14 is a view of a conventional three-panel type projection unit from the R-channel display device side.

The deviation of the optical (reference) axis of the projection optical system is effective, particularly, in the case where the asymmetry of the effective area is great, e.g., in the case where the deviation amount from the center of the reduction-side conjugate surface in the gravitational (vertical) direction is such that the reference optical axis deviates to the vicinity of the upper edge of the liquid crystal display device as shown in FIG. 14. Namely, where dya represents a deviation amount of the center of the liquid crystal display device from the reference optical axis and Ya an effective width of the reduction-side conjugate surface (liquid crystal display device) in the vertical direction, the following condition (1) is met.

$$0.45 < dya/Ya < 0.75 \tag{1}$$

In general, a state of dya/Ya=0.5 is called a "full shift state", in which the image is not projected below the reference optical axis of the projection optical system in the liquid crystal display region on the magnification-side conjugate surface.

It can also be contemplated that the optical elements constituting the projection optical system are mirrors of catoptrics such as parabolic mirrors or ellipsoidal mirrors or the like, but it is difficult to secure a large pupil diameter in use of the projection optical system based on the catoptric configuration. When consideration is also given to the configuration, arrangement, etc. of the optical elements, the optical elements are desirably comprised of lenses of dioptrics. Furthermore, various aberrations can be corrected well by adopting the aspheric shape for the lenses.

The projection optical system is preferably a zoom optical system comprised of a plurality of blocks and configured to continuously vary the magnification of image by moving at least two of the blocks, whereby the projection size can be flexibly adjusted within a magnification range of the projection lens even under the projection condition that the screen size and the projection distance are fixed. Furthermore, in a configuration wherein two blocks at the extremes on the magnification and reduction conjugate sides are fixed relative to the reduction-side conjugate surface, the total length of the projection optical system is invariant during the zoom operation and toughness is secured for the configuration of the projection optical system. Furthermore, when focus adjustment to change the image field size with change of the projection distance is implemented by adjusting the block located at the extreme on the magnification side (so-called front lens group focusing), a zooming projection lens can be substantiated by a simple mechanism.

Each of embodiments of the present invention will be described below.

Figure 1:
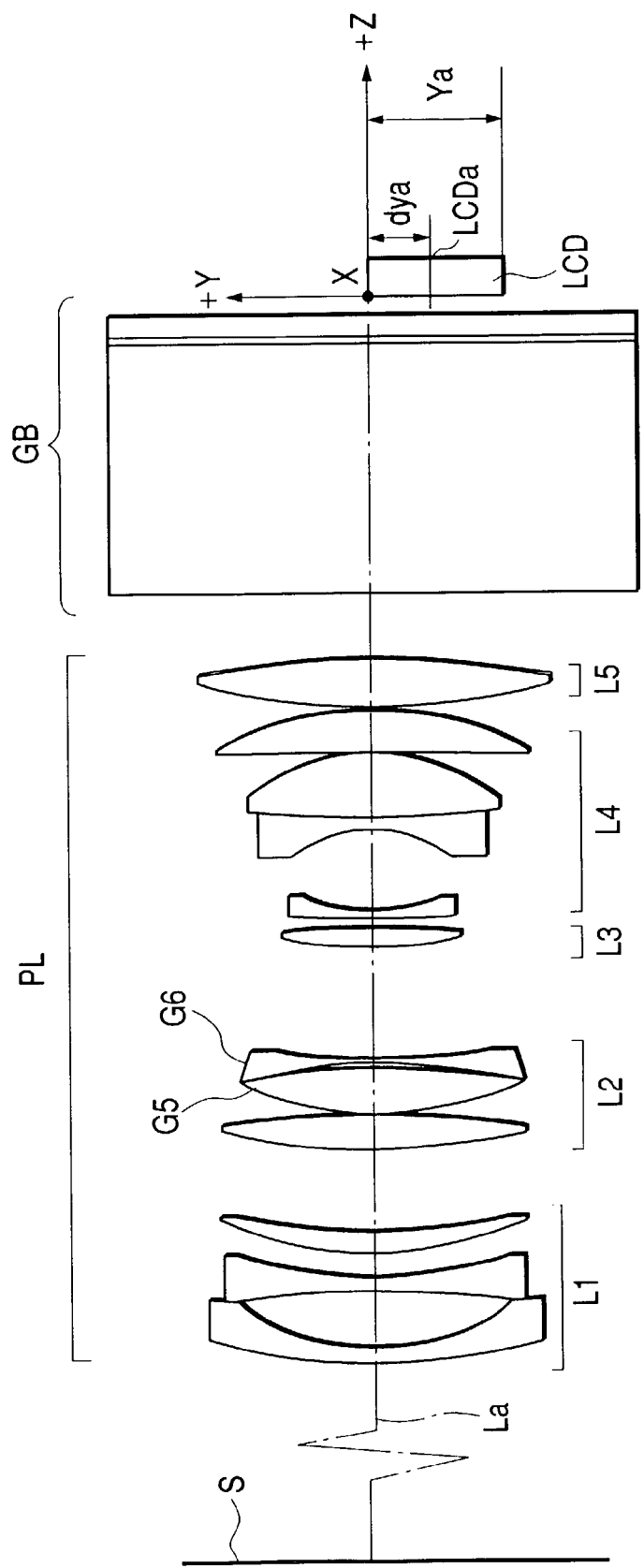
FIG. 1 is a principal, sectional view of First Embodiment of the projection apparatus according to the present invention.

FIG. 1 is a sectional view of lenses at the wide-angle end in first numerical embodiment of the present invention.

Figure 2:
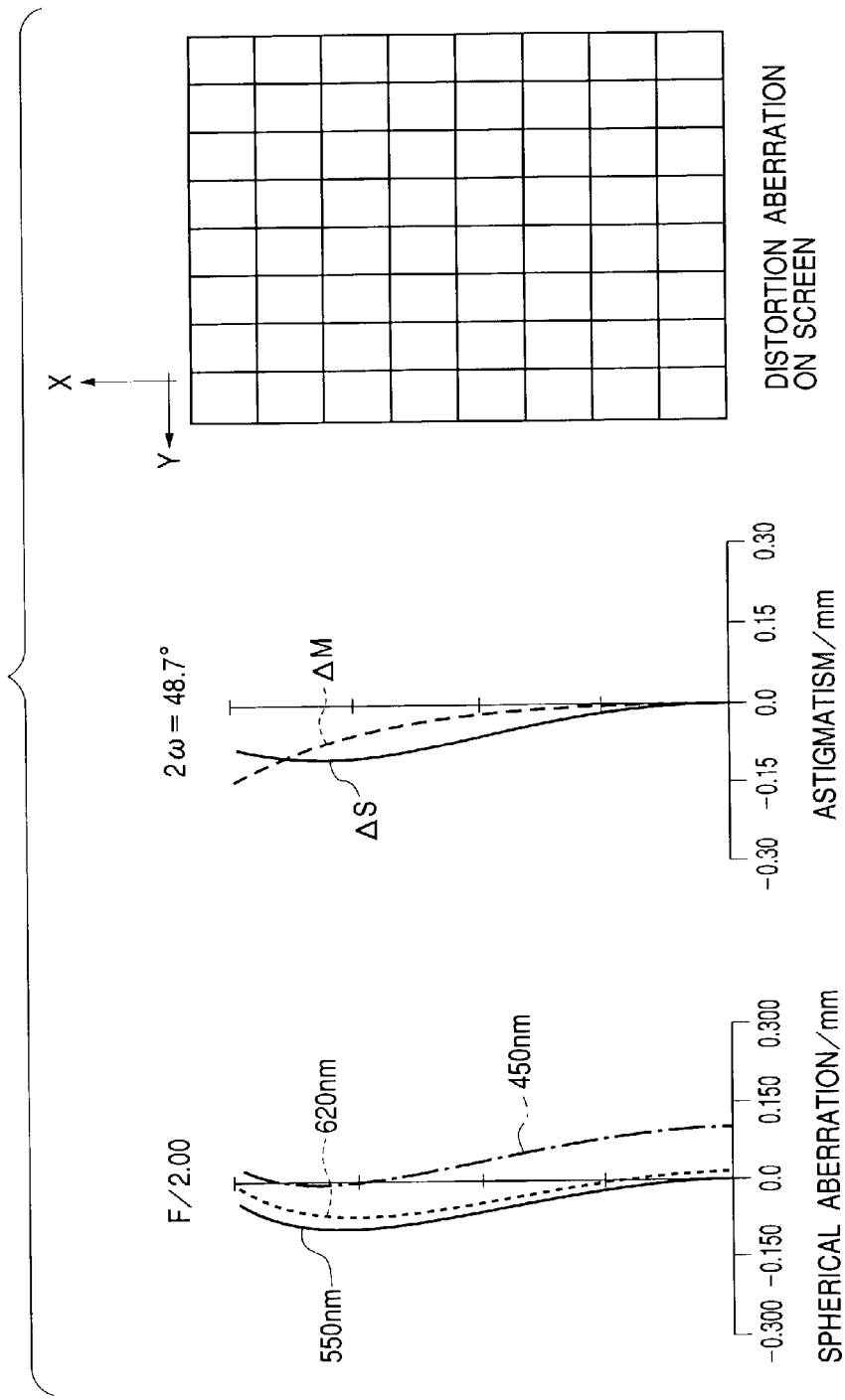
FIG. 2 is an aberration chart showing spherical aberration, curvature of field (on the liquid crystal side), and distortion aberration (on the screen side) at the wide-angle end with focus at 2.8 m in first numerical embodiment of the present invention.

FIG. 2 is an aberration chart at the wide-angle end in first numerical embodiment of the present invention.

Figure 3:
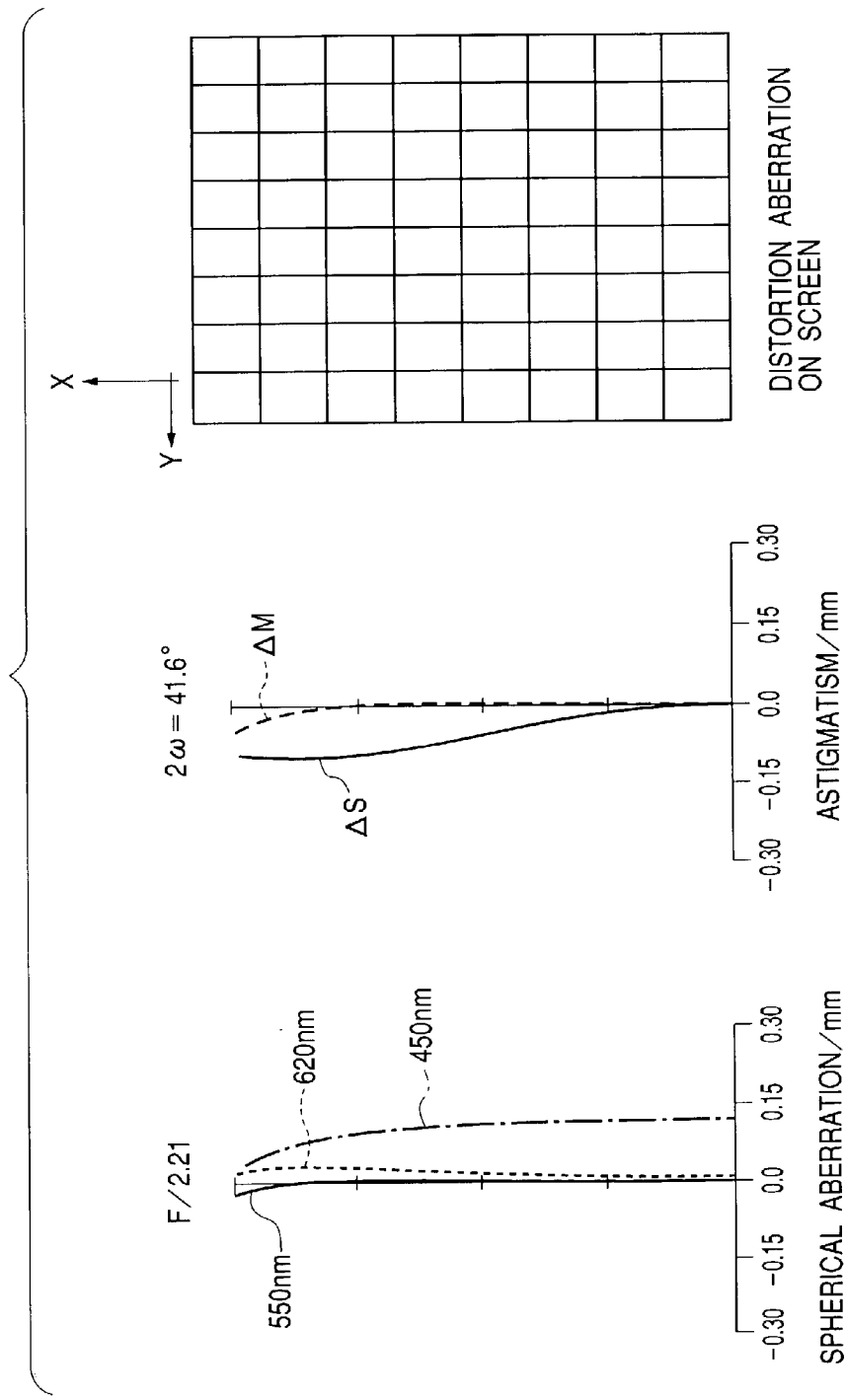
FIG. 3 is an aberration chart showing spherical aberration, curvature of field (on the liquid crystal side), and distortion aberration (on the screen side) at the telephoto end with focus at 2.8 m in first numerical embodiment of the present invention.

FIG. 3 is an aberration chart at the telephoto end in first numerical embodiment of the present invention.

Figure 4:
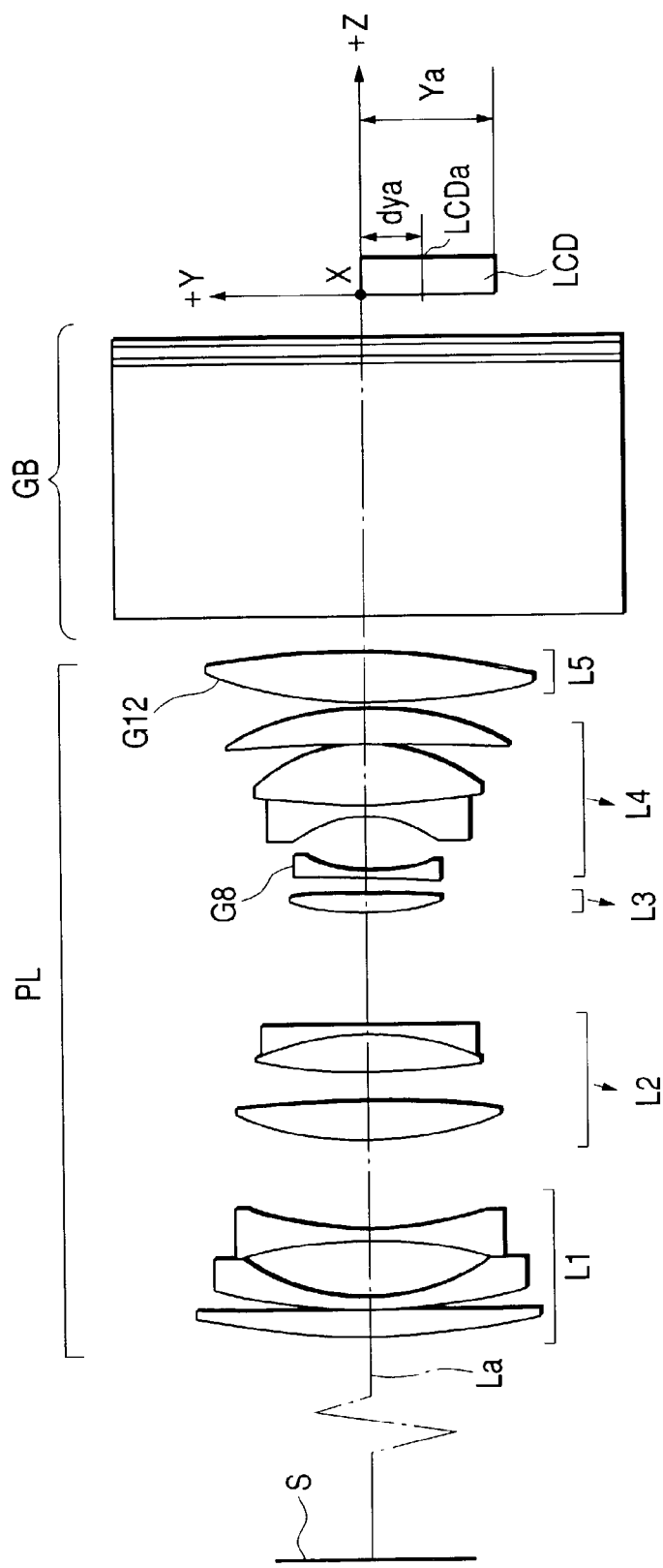
FIG. 4 is a principal, sectional view of Second Embodiment of the projection apparatus according to the present invention.

FIG. 4 is a sectional view of lenses at the wide-angle end in second numerical embodiment of the present invention.

Figure 5:
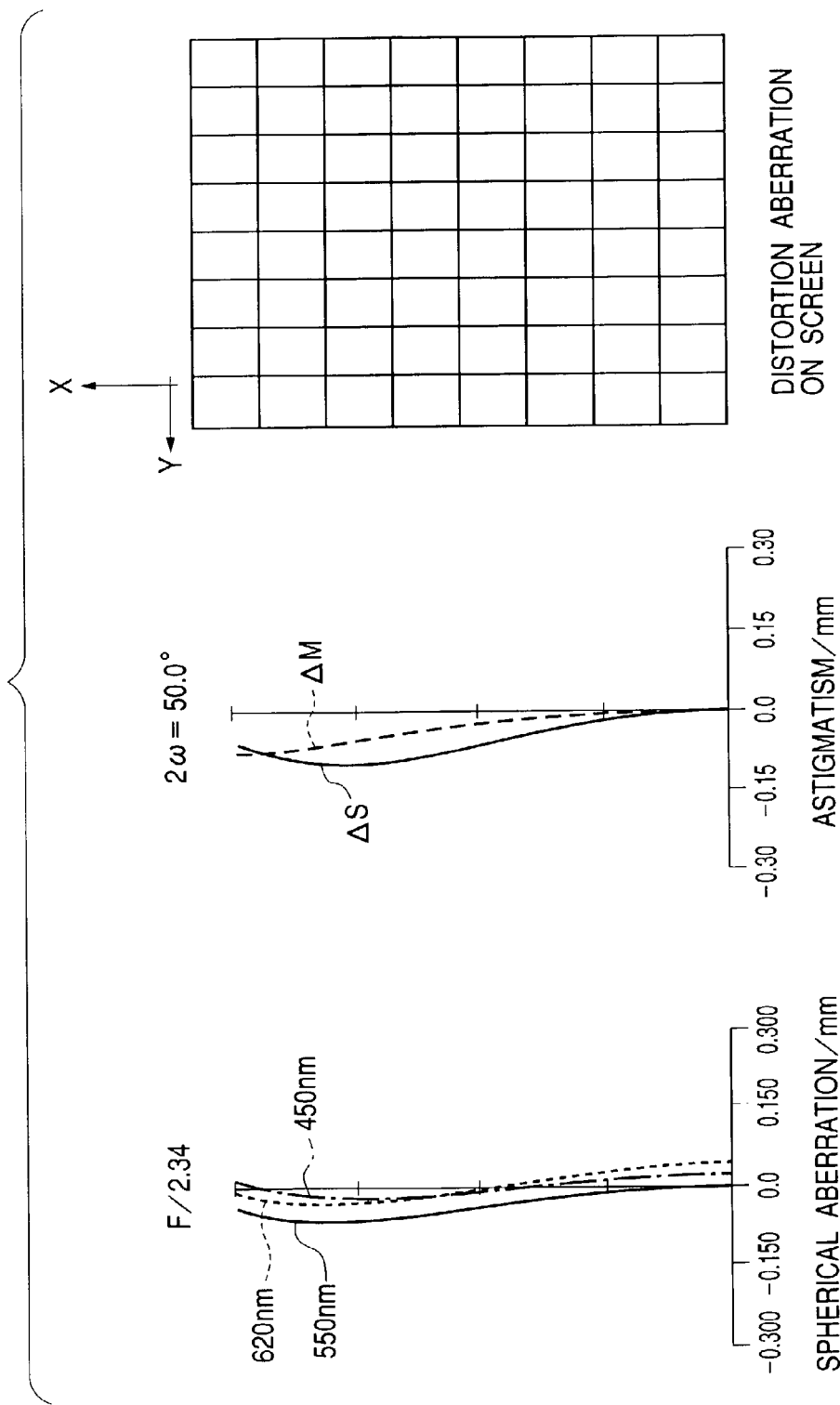
FIG. 5 is an aberration chart showing spherical aberration, curvature of field (on the liquid crystal side), and distortion aberration (on the screen side) at the wide-angle end with focus at 2.8 m in second numerical embodiment of the present invention.

FIG. 5 is an aberration chart at the wide-angle end in second numerical embodiment of the present invention.

Figure 6:
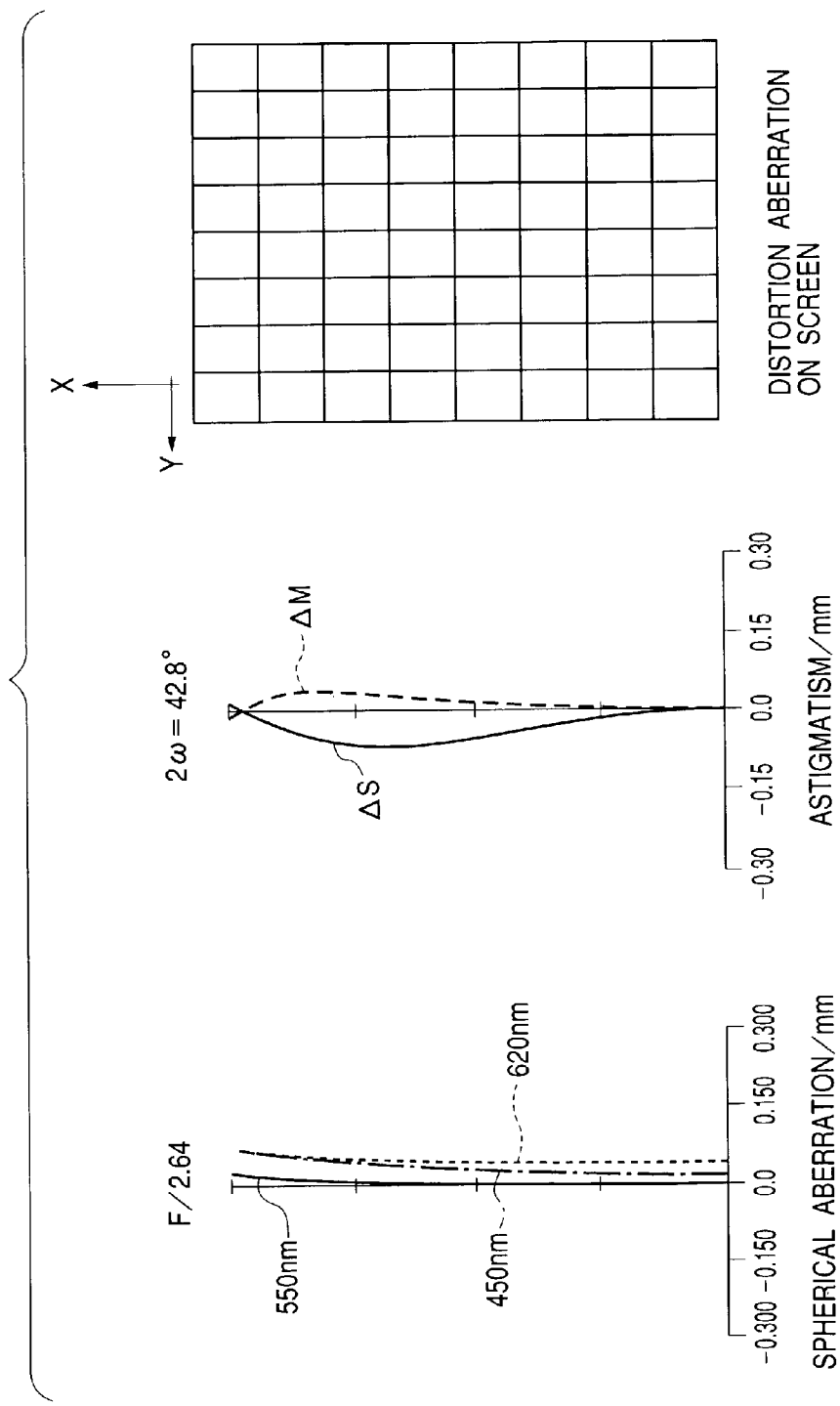
FIG. 6 is an aberration chart showing spherical aberration, curvature of field (on the liquid crystal side), and distortion aberration (on the screen side) at the telephoto end with focus at 2.8 m in second numerical embodiment of the present invention.

FIG. 6 is an aberration chart at the telephoto end in second numerical embodiment of the present invention.

Figure 7:
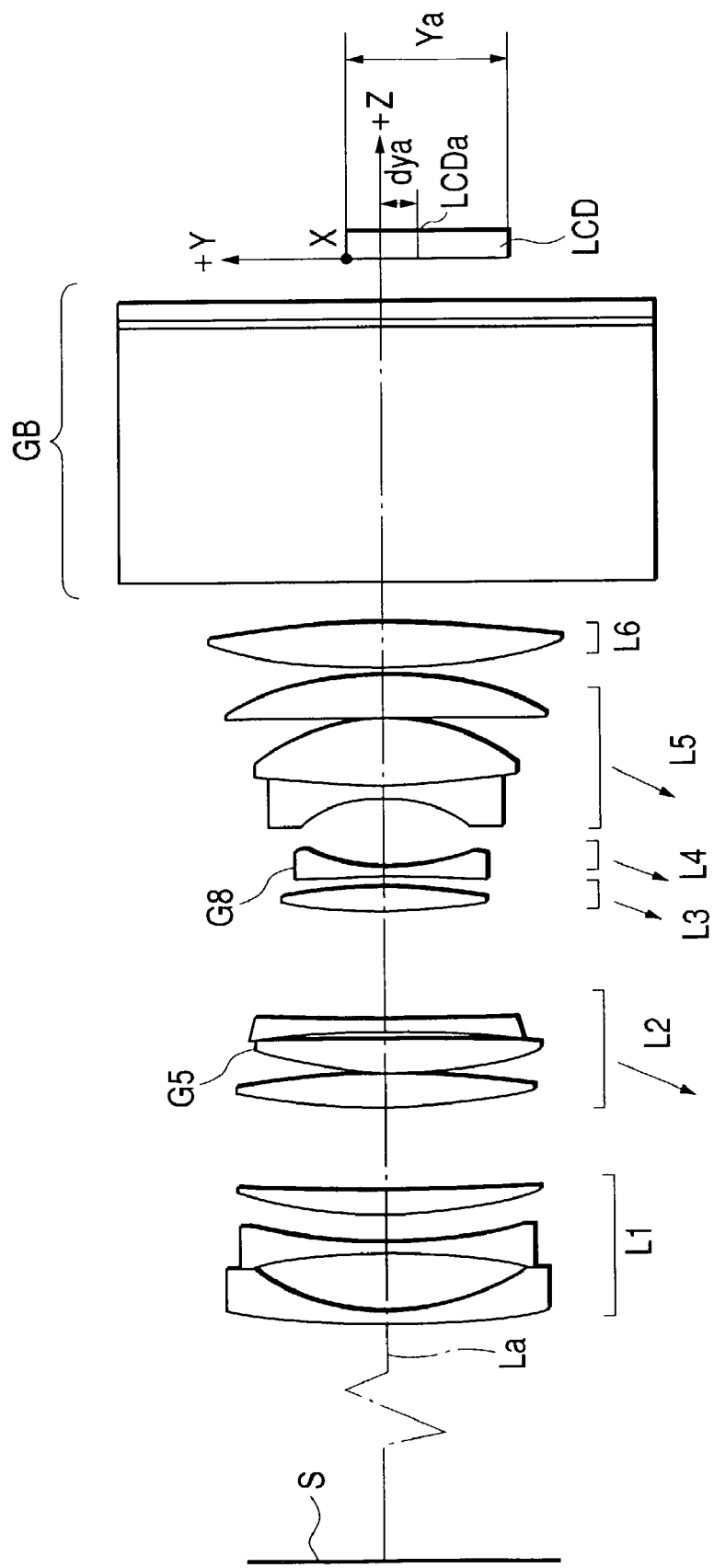
FIG. 7 is a principal, sectional view of Third Embodiment of the projection apparatus according to the present invention.

FIG. 7 is a sectional view of lenses at the wide-angle end in third numerical embodiment of the present invention.

Figure 8:
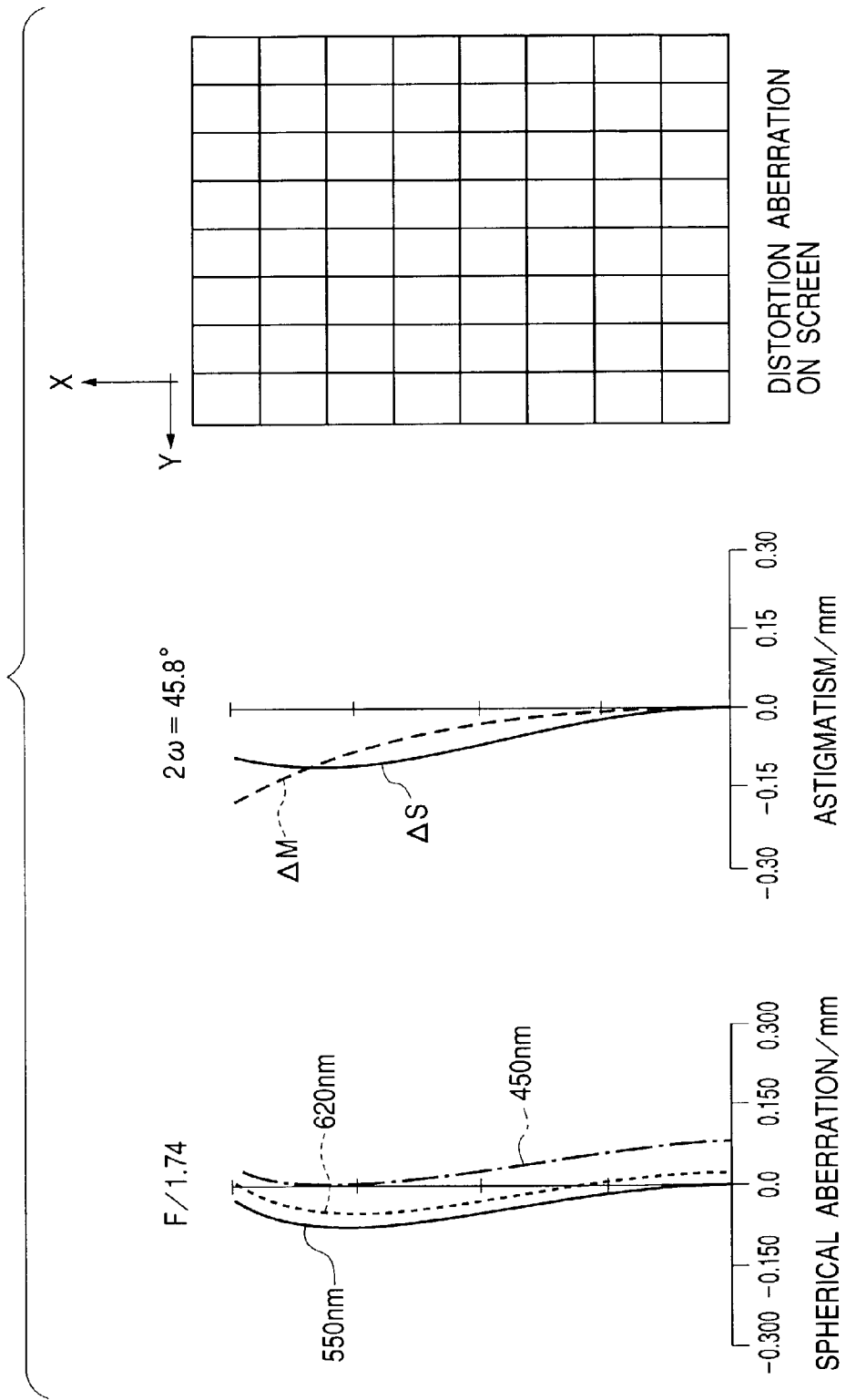
FIG. 8 is an aberration chart showing spherical aberration, curvature of field (on the liquid crystal side), and distortion aberration (on the screen side) at the wide-angle end with focus at 2.8 m in third numerical embodiment of the present invention.

FIG. 8 is an aberration chart at the wide-angle end in third numerical embodiment of the present invention.

Figure 9:
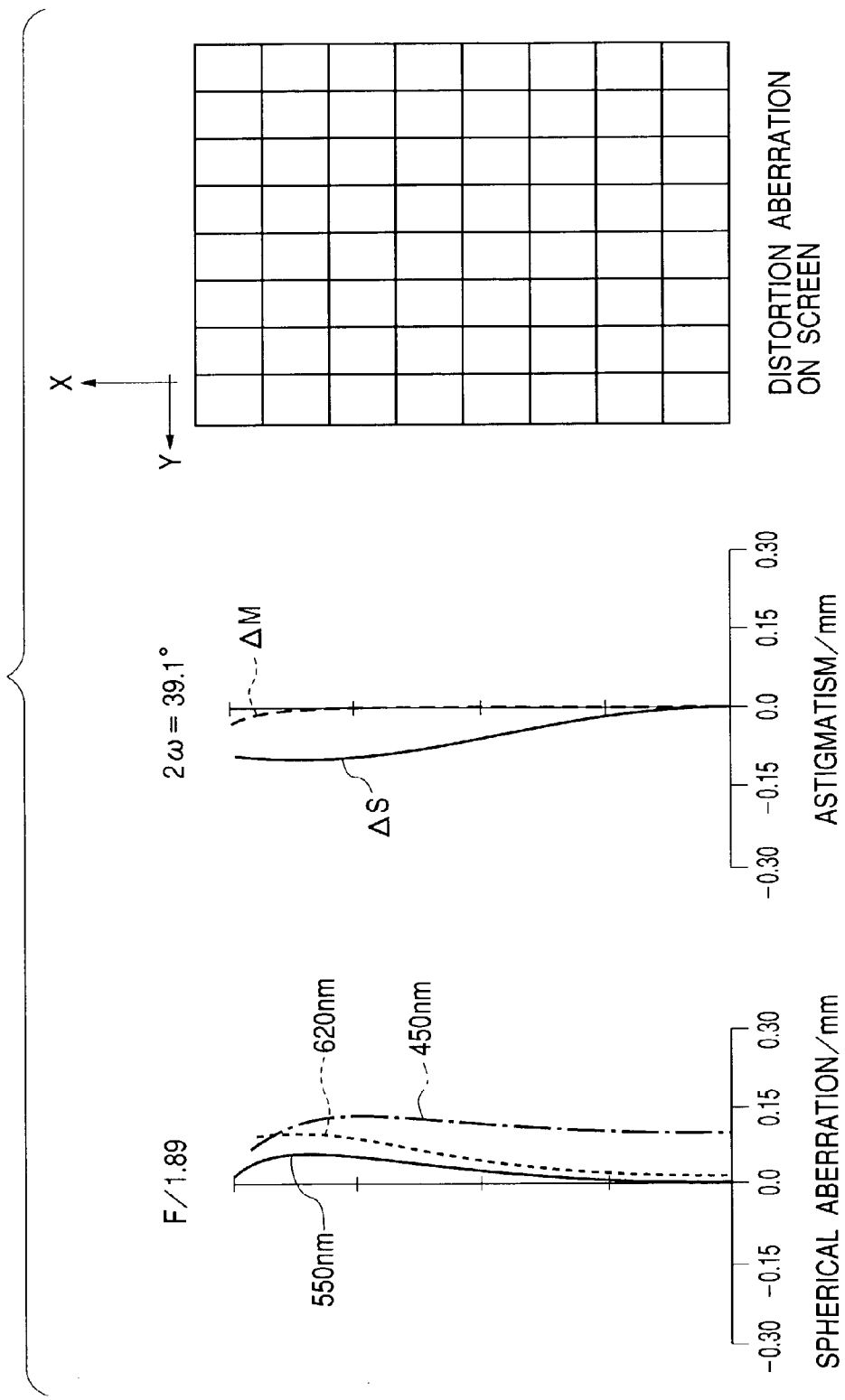
FIG. 9 is an aberration chart showing spherical aberration, curvature of field (on the liquid crystal side), and distortion aberration (on the screen side) at the telephoto end with focus at 2.8 m in third numerical embodiment of the present invention.

FIG. 9 is an aberration chart at the telephoto end in third numerical embodiment of the present invention.

Figure 10:
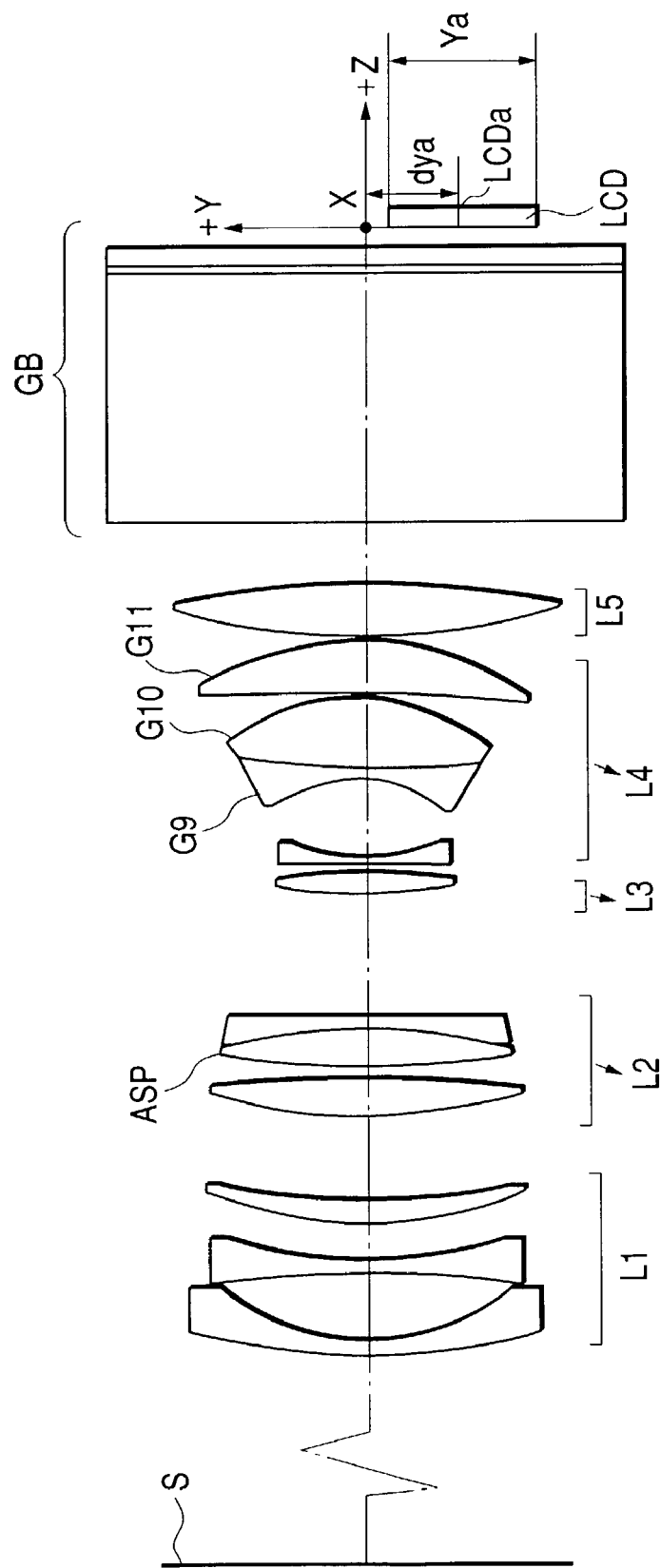
FIG. 10 is a principal, sectional view of Fourth Embodiment of the projection apparatus according to the present invention.

FIG. 10 is a sectional view of lenses at the wide-angle end in fourth numerical embodiment of the present invention.

Figure 11:
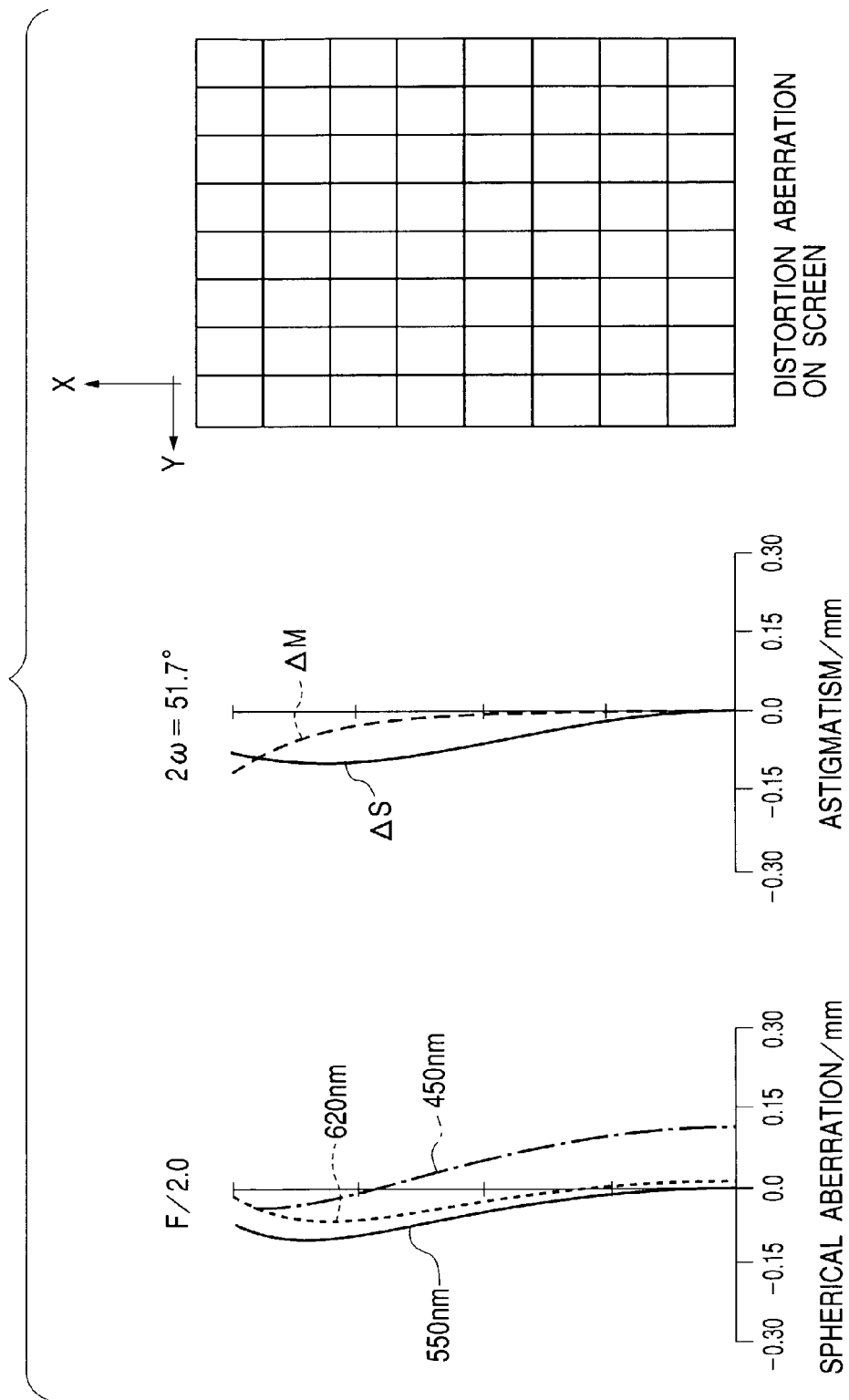
FIG. 11 is an aberration chart showing spherical aberration, curvature of field (on the liquid crystal side), and distortion aberration (on the screen side) at the wide-angle end with focus at 2.8 m in fourth numerical embodiment of the present invention.

FIG. 11 is an aberration chart at the wide-angle end in fourth numerical embodiment of the present invention.

Figure 12:
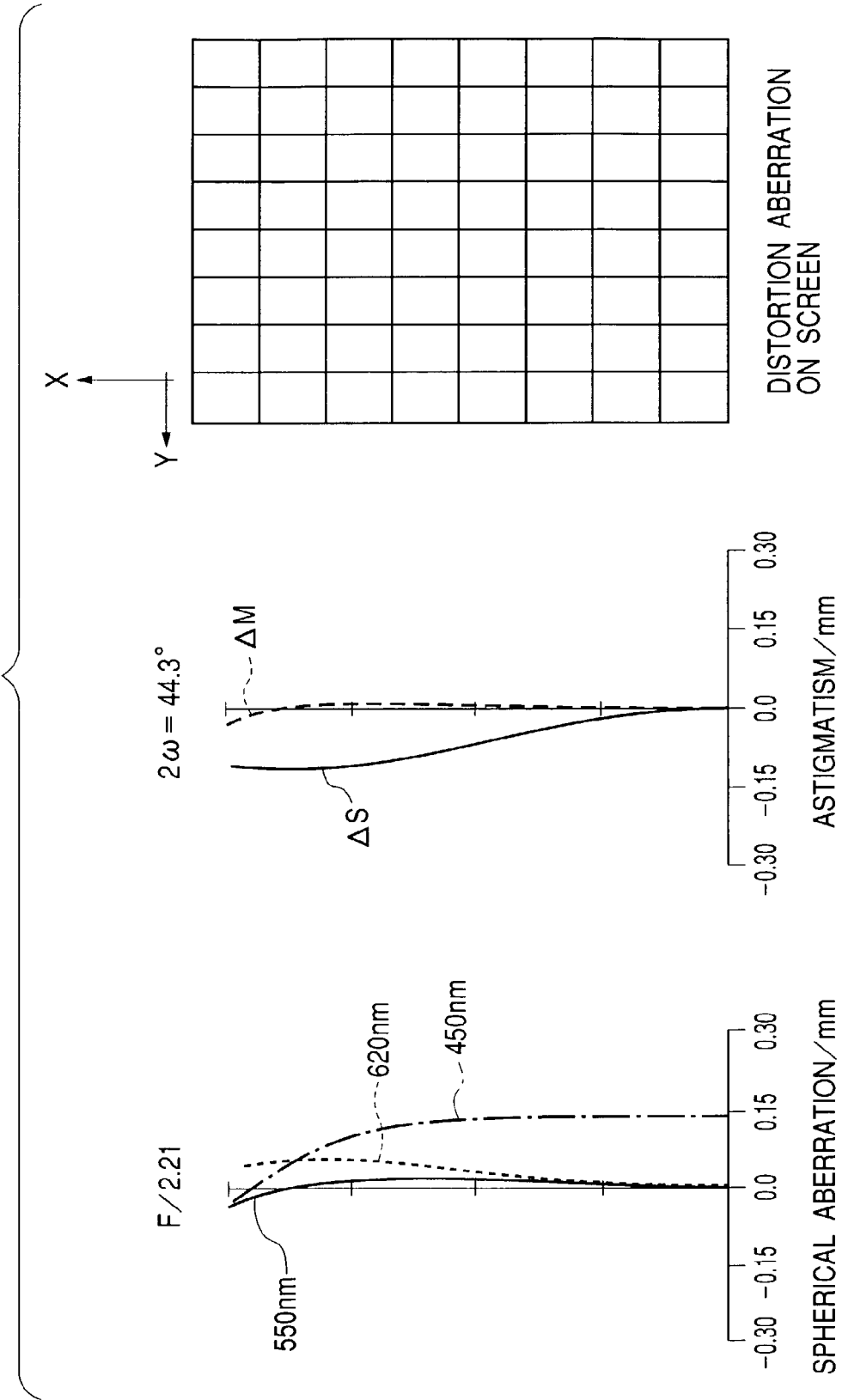
FIG. 12 is an aberration chart showing spherical aberration, curvature of field (on the liquid crystal side), and distortion aberration (on the screen side) at the telephoto end with focus at 2.8 m in fourth numerical embodiment of the present invention.

FIG. 12 is an aberration chart at the telephoto end in fourth numerical embodiment of the present invention.

In each aberration chart, where the numerical embodiment is expressed in units of mm, there are provided the spherical aberration (on the liquid crystal side), curvature of field (on the liquid crystal side), and distortion aberration (on the screen side) in the projection on the screen 2.8 m ahead of the image surface of the display.

First Embodiment shown in FIG. 1 will be described first.

In the sectional view of lenses, PL represents the projection optical system, which consists of a zoom lens. Symbol L1 designates a first unit with a negative refracting power (first lens unit), L2 a second unit with a positive refracting power (second lens unit), L3 a third unit with a positive refracting power (third lens unit), L4 a fourth unit with a negative refracting power (fourth lens unit), and L5 a fifth unit with a positive refracting power (fifth lens unit). Throughout the specification, each lens unit is equivalent to a lens unit having at least one optical element (a lens, a mirror, or the like).

S denotes a screen surface (surface to be projected), and LCD an original image of a liquid crystal display device (liquid crystal display element) or the like. The screen surface S and the original image LCD are in conjugate relation; in general, the screen surface S corresponds to a conjugate point at a longer distance (first conjugate point), and the original image LCD to a conjugate point at a shorter distance (second conjugate point).

The screen surface S and the original image LCD are set normal to the reference optical axis La of the projection optical system PL (an axis with which the optical axes of most of the lenses agree, because the optical axes of all the lenses do not agree with each other).

GB denotes a glass block such as a color combining prism, a polarizing filter, a color filter, or the like.

The projection optical system PL is mounted through a joint member (not shown) on the main body of the liquid crystal projector. The glass block GB and the members behind it on the liquid crystal display element LCD side are set in the main body of the projector.

During the zoom operation from the wide-angle end to the telephoto end, the first lens unit and the fifth lens unit are fixed, the total length is fixed during the zoom operation, and the second to fourth lens units move independently of each other to the magnification side. Each lens surface is provided with a multilayer coat in order to secure the illuminance on the screen S.

Much the same is true in each of the embodiments below on the provision of the multilayer coat on each lens surface and on the vertical arrangement of the screen surface S and the liquid crystal element LCD with respect to the optical axis La.

Figure 13:
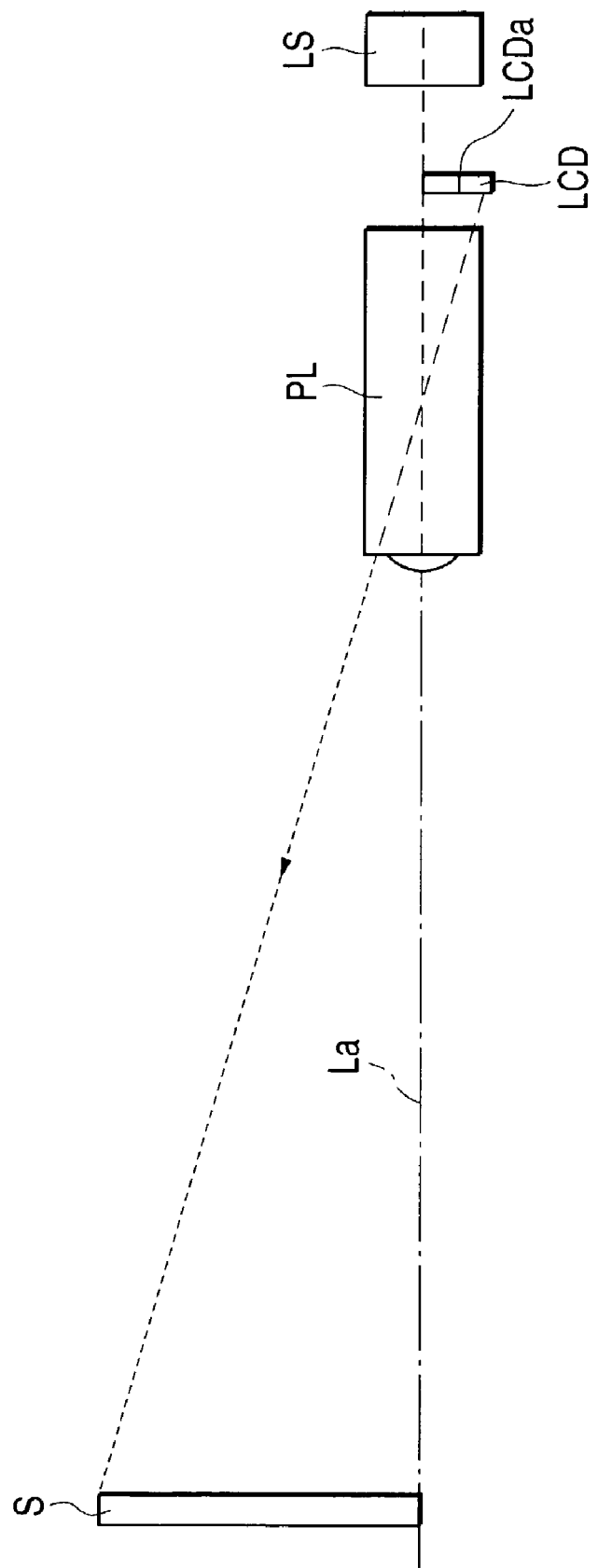
FIG. 13 is a principal, schematic diagram of the projection apparatus according to the present invention.

FIG. 13 is a schematic diagram showing a state in which the projection optical system PL in the projection apparatus of the present invention upwardly magnifies and projects the image information based on the image display device (LCD), onto the screen S.

In the case of a color liquid crystal projector, a color separating system (not shown) is placed between the liquid crystal display apparatus (LCD) and the light source means (LS), and a color combining system (not shown) between the projection optical system (PL) and the image display apparatus (LCD).

The image display element (LCD) has its center LCDa shifted or/and tilted in the gravitational direction (vertical direction) with respect to the reference optical axis La of the projection optical system PL.

In the present embodiment the liquid crystal display device LCD has its center LCDa deviating from the reference optical axis La of the projection optical system PL in the gravitational direction (the vertical direction or the direction of −Y).

The deviation amount dya of the center LCDa is determined so as to satisfy the following condition, where the effective width of the liquid crystal device LCD in the gravitational (vertical) direction is Ya.

$$0.45 < dya/Ya < 0.75 \quad (1)$$

Specifically, while the length of the display area of the liquid crystal display device LCD is 13.9 mm in the gravitational direction (in the direction Y), the center of the liquid crystal display device LCD deviates by about 6.95 mm from the reference optical axis La in the downward direction (in the direction of −Y), thereby realizing the so-called full shift specification for upward projection on the magnification side.

Namely, the ratio in the foregoing condition (1) is determined as follows.

$$dya/Ya = 0.5$$

In the numerical embodiments described hereinafter, shift and tilt decentering amounts are expressed in respective units of mm and deg.

In the present embodiment two lenses G5, G6 with positive and negative refracting powers forming the second lens unit L2 are arbitrarily deviated (decentered with a shift) integrally or independently of each other from the optical (reference) axis La of the projection optical system PL in the downward direction (in the direction of −Y in FIG. 1), and are fixedly held.

For this reason, the symmetry of the liquid crystal display area is preserved in the horizontal direction (direction X) normal to the plane of the drawing (the liquid crystal display area is symmetric with respect to the Y-axis).

The projection optical system PL is symmetric with respect to the optical axis La in the XZ section, but it is asymmetric with respect to the optical axis La in the YZ section.

In view of decentering aberration, these lenses G5, G6 will demonstrate little degradation of decentering coma if the optical axes of the lenses G5, G6 are deviated (or shift-decentered) in the same direction with respect to the optical axis La. It is thus feasible to freely correct the curvature of field. If the optical axes of the lenses G5, G6 are deviated in opposite directions contrary, there will appear little curvature of field, and coma can be corrected to some extent by the decentering coma. In the present embodiment, the optical axes of the lenses G5, G6 deviate from the optical axis La in the same direction (in the direction of −Y). The deviation amounts of the lenses G5, G6 are independent of each other, and correction can be made well for the curvature of field, particularly, at image heights in the range from the intermediate zone of the screen to the marginal extreme of the screen, which was not removed well in the configuration of the coaxial system. It is also possible to make correction for coma by shifting the optical axes of the lenses G5 and G6 in directions opposite to each other, depending upon aberration in question.

Another single lens or other lenses may be arranged with the optical axis being shifted relative to the optical axis La, instead of the lenses G5, G6.

In the present embodiment, preferably, a reciprocating type holding mechanism is provided for all the lens units, because it is difficult to select a lens with the optical axis being shifted relative to the optical axis La from a lens unit with a mechanism moving while rotating or the like.

In the present embodiment the first unit is moved on the optical axis to achieve focus. It is also possible to achieve focus by moving the fifth unit which is fixed during the zoom operation.

FIGS. 2 and 3 show states of aberrations at the wide-angle end and at the telephoto end in the case where the numerical embodiment described below is expressed in units of mm, the distance is 2.8 m between the liquid crystal display element LCD and the screen S, and focus is achieved by the first unit L1. In these charts image heights of astigmatism are those on the LCD display area side. The distortion aberration is distortion on the screen side.

The aberration charts all are depicted in the same indication way throughout the embodiments described below.

Second Embodiment of the present invention shown in FIG. 4 will be described below.

The present embodiment is different from First Embodiment in that lenses are tilted instead of the lenses shifted. The projection optical system PL is of the same zoom type of the five-unit configuration.

In the present embodiment a lens G8 with a negative refracting power forming the fourth lens unit L4 and a lens G12 with a positive refracting power forming the fifth lens unit L5 are fixedly held so that their optical axes are inclined (or tilt-decentered) independently of each other from the reference axis La of the projection optical system PL, as shown in FIG. 4.

The symmetry of the liquid crystal display area is preserved in the horizontal direction (the direction X) (the liquid crystal display area is symmetric with respect to the Y-axis).

In view of the decentering aberration, these lenses G8, G12 will demonstrate little degradation of decentering coma if their optical axes are inclined (or tilt-decentered) in the same direction. It is thus feasible to freely correct the curvature of field. If the optical axes are inclined in directions opposite to each other contrary, there will occur little curvature of field, so that the coma can be corrected by the decentering coma. In the present embodiment, the optical axes of the lenses G8 and G12 are tilted independently of each other in the same direction, whereby correction can be made well for the curvature of field, particularly, at image heights in the range from the intermediate zone of the screen to the marginal extreme of the screen, which was not removed well in the configuration of only the coaxial system. The coma may also be corrected by tilting the lenses G8 and G12 in directions opposite to each other, depending upon aberration in question.

The ratio in the aforementioned condition (1) is determined as follows.

$$dya/Ya = 0.5$$

In the present embodiment, the lenses G8 and G12 may be shifted while being tilted.

Since the present embodiment is much the same in the other respects as First Embodiment, the detailed description thereof is omitted herein.

Third Embodiment of the present invention shown in FIG. 7 will be described below.

In the sectional view of lenses, PL designates the projection optical system which consists of a zoom lens. Symbol L1 denotes a first unit with a negative refracting power (first lens unit), L2 a second unit with a positive refracting power (second lens unit), L3 a third unit with a positive refracting power (third lens unit), L4 a fourth unit with a negative refracting power (fourth lens unit), L5 a fifth unit with a positive refracting power (fifth lens unit), and L6 a sixth unit with a positive refracting power (sixth lens unit).

S indicates the screen surface (projection surface), and LCD the original image (a surface to be projected) of the liquid crystal panel (liquid crystal display element) or the like. The screen surface S and the original image LCD are in conjugate relation, and in general, the screen surface S is equivalent to the conjugate point at the longer distance (first conjugate point), and the original image LCD to the conjugate point at the shorter distance (second conjugate point).

GB represents a glass block such as a color combining prism, a polarizing filter, a color filter, or the like.

The projection optical system PL is mounted through a joint member (not shown) on the main body of the liquid crystal projector. The glass block GB and the members behind it on the liquid crystal display element LCD side are set in the main body of the projector.

During the zoom operation from the wide-angle end to the telephoto end, the first lens unit and the sixth lens unit are fixed, the total length is fixed during the zoom operation, and the second to fifth lens units move independently of each other to the magnification side. Each lens surface is provided with a multilayer coat in order to secure the illuminance on the screen S.

The screen surface S and the liquid crystal element (LCD) are set normal to the reference axis (Z-axis) La of the projection optical system PL.

In the present embodiment the liquid crystal element LCD has its center LCDa deviating from the optical axis La of the projection optical system PL in the gravitational direction (the vertical direction or the direction of −Y).

Specifically, while the length of the display area of the liquid crystal display element LCD is 13.9 mm in the gravitational direction (the direction Y), the center LCDa deviates by about 5.53 mm from the lens reference axis La in the downward direction (in the direction of −Y), thereby implementing upward projection on the magnification side.

Namely, the ratio in the aforementioned condition (1) is determined as follows.

$dya/Ya=0.45$

In the present embodiment a lens G5 with a positive refracting power forming the second lens unit L2 and a lens G8 with a negative refracting power forming the fourth lens unit L4 are fixedly held while being arbitrarily deviated (or shift-decentered) independently of each other from the reference axis La of the projection optical system PL. The symmetry is preserved for the liquid crystal display area in the horizontal direction (the direction X) (the liquid crystal display area is symmetric with respect to the Y-axis).

The projection optical system PL is symmetric with respect to the optical axis La in the XZ section, but it is asymmetric with respect to the optical axis La in the YZ section.

By noting the fact that the lens G8 has the decentering coma sensitivity of almost 0 to shift decentering, the lens G5 is used to positively generate decentering coma so as to make correction for coma of the coaxial system, and the curvature of field due to the decentering of the lens G5 is corrected by the lens G8.

When the large-aperture projection lens with the aperture ratio of about 1.7 at the wide-angle end as in the present embodiment is required to have some response at high spatial frequencies, the permissible circle of confusion becomes smaller whereby the depth becomes shallower on the image surface side. For this reason, the resolution will become quickly worse if the curvature of field and astigmatism are large at intermediate image heights. Therefore, adequate consideration is given, particularly, to the aberration of the image surface system.

Fourth Embodiment of the present invention shown in FIG. 10 will be described below.

The present embodiment is different from First and Third Embodiments in that lenses are tilted instead of the lenses shifted.

The projection optical system PL is of the same zoom type of the five-unit configuration, but is different in use of an aspheric surface ASP.

The liquid crystal display element LCD deviates by about 8.34 mm from the optical (reference) axis La of the lens in the downward direction (the direction of −Y) against the length of the display area of 13.9 mm in the gravitational direction (the vertical direction), thereby implementing upward projection on the magnification side.

Namely, the ratio in the aforementioned condition (1) is determined as follows.

$dya/Ya=0.63$

In the present embodiment the optical (reference) axis La of the projection optical system is located up (in the direction of +Y) from the display area of the liquid crystal display element LCD.

For this reason, the projection optical system has a large angle of field, and the outside diameters of the lenses and the like are thus also large. An aspheric surface is applied to a lens G5 in order to make correction for higher-order aberration of curvature of field or the like due to rays passing the peripheral regions of the large lenses, and a material of FK01 (trade name) is applied as a material of a lens G10 with a positive refracting power in order to make correction for higher-order chromatic aberration of magnification. Concerning the aspheric surface, it is also conceivable to employ an aspheric surface of a plastic material, depending upon the sensitivity of the element surface to which it is applied. However, an aspheric surface of a glass mold type with excellent surface accuracy is preferable, particularly, in consideration of the aspheric surface applied to the projection optical system of the XGA class using the compact liquid crystal display device. In the present embodiment the aspheric surface is located relatively deep inside the optical system like the lens G5 in view of the requirements from the manufacturing aspect, but the location of the aspheric surface does not always have to be limited particularly to this location. In order to effectively correct the off-axis aberration, particularly, distortion or the like by the aspheric surface, it is preferable to apply the aspheric surface to an element farthest from a stop located in the vicinity of the third lens unit L3, e.g., an element at the extreme on the magnification or reduction side.

The material FK01 is adopted in the lens G10 with the positive refracting power forming a cemented lens in the fourth lens unit L4 in the present embodiment, but the invention is not limited to this example. Particularly, when the system is constructed in a configuration wherein the material is adopted, particularly, in a lens with a negative refracting power or the like in the block at the extreme on the magnification side farthest from the position of the stop (the first lens unit), the configuration is excellent in correction for chromatic aberration of magnification, particularly, on the short wavelength side of visible light.

Furthermore, the aspheric surface in the present embodiment is a rotationally symmetric, aspheric surface, but use of a special aspheric surface (a surface defined by Zernike polynomials or the like), for example, also acts advantageous in correction for asymmetric distortion aberration or the like in the vertical direction specific to the projection optical system for upward projection with the shift mechanism as in the present embodiment. In use of such a special aspheric surface, it is desirable to apply it to a fixed lens surface or the like, for example, in the fifth lens unit L5 in which ray passing positions are invariant during the zoom operation.

In the present embodiment lenses G9 to G11 with negative, positive, and positive refracting powers forming the fourth lens unit L4 are fixedly held while being arbitrarily inclined (or tilt-decentered) independently of each other from the optical (reference) axis of the projection optical system, and the symmetry of the liquid crystal display area is preserved in the horizontal direction (the liquid crystal display area is symmetric with respect to the Y-axis). This configuration is effective in correction for curvature of field and astigmatism in the range from the intermediate zone of the screen to the marginal zone of the screen mainly at the wide-angle end. It is also possible to employ the shift decentering of lens surfaces, depending upon aberration in question.

Since the present embodiment is much the same in the other respects as First Embodiment, the detailed description thereof is omitted herein.

The numerical embodiments of the present invention will be presented below. In the numerical embodiments, i indicates a number of each surface in the order from the screen side, Ri a radius of curvature of each surface, Di a thickness of a member or an air space between the ith surface and the (i+1)th surface in the order from the screen side, and Ni and Vi an index of refraction and an Abbe's number of each optical member for the d line.

The last two surfaces in each numerical embodiment indicate an optical filter, a face plate, or the like.

The aspheric surface shape is expressed by the equation below, where displacement in the optical-axis direction at the position of the height H from the optical axis is X with respect to the reference at the vertex of the surface, the positive direction is taken along the traveling direction of light, R is the paraxial radius of curvature, and A, B, C, D, and E represent aspheric surface coefficients.

$$X = \frac{(1/R)H^2}{1+\sqrt{1-(1+K)(H/R)^2}} + AH^2 + BH^4 + CH^6 + DH^8 + EH^{10}$$

W represents the wide-angle end and T the telephoto end. Y-Decenter indicates a shift amount (mm) in the Y-direction, and Y-Tilt a tilt amount (deg).

| Lens spec & data | | | |
|---|---|---|---|
| $2\omega = 48.7°\sim 41.6°$ | | | |
| f: 36.8 mm–43.8 mm   FNO: 2.00–2.21 | | | |

| | r | d | nd | Vd |
|---|---|---|---|---|
| 1 | 80.896 | 1.90 | 1.528 | 63.8 |
| 2 | 27.035 | 7.55 | | |
| 3 | −152.144 | 1.70 | 1.487 | 70.2 |
| 4 | 53.142 | 3.17 | | |
| 5 | 44.020 | 2.74 | 1.806 | 40.9 |
| 6 | 73.404 | ( ) | | |
| 7 | 77.614 | 4.57 | 1.772 | 49.6 |
| 8 | −104.947 | 0.15 | | |
| 9 | 49.995 | 4.49 | 1.822 | 39.0 |
| 10 | −291.846 | 0.46 | | |
| 11 | −157.045 | 1.22 | 1.847 | 23.8 |
| 12 | 113.077 | ( ) | | |
| 13 | 50.846 | 2.64 | 1.712 | 52.3 |
| 14 | −117.710 | ( ) | | |
| 15 | 1098.317 | 1.00 | 1.610 | 36.4 |
| 16 | 23.148 | 10.16 | | |
| 17 | −16.500 | 1.54 | 1.723 | 29.7 |
| 18 | 103.319 | 8.27 | 1.487 | 70.2 |
| 19 | −24.000 | 0.15 | | |
| 20 | −674.198 | 5.59 | 1.658 | 50.9 |
| 21 | −37.633 | ( ) | | |
| 22 | 83.582 | 6.00 | 1.744 | 44.8 |
| 23 | −99.844 | ( ) | | |
| 24 | inf. | 32.00 | 1.516 | 64.1 |
| 25 | inf. | 0.00 | | |
| 26 | inf. | 0.80 | 1.760 | 55.0 |
| 27 | inf. | 0.00 | | |
| 28 | inf. | 0.20 | 1.500 | 65.0 |
| 29 | inf. | 0.00 | | |
| 30 | inf. | 2.30 | 1.490 | 65.0 |
| 31 | inf. | | | | zoom data

| | W | T |
|---|---|---|
| d 6 | 11.40 | 3.28 |
| d12 | 14.55 | 14.76 |
| d14 | 1.26 | 2.82 |
| d21 | 0.50 | 6.84 |
| d23 | 8.00 | 8.00 |

Decenter & Tilt data

| | Y-Decenter | Y-Tilt |
|---|---|---|
| 9 | −0.01 | 0.00 |
| 10 | −0.01 | 0.00 |
| 11 | −0.04 | 0.00 |
| 12 | −0.04 | 0.00 |

| $2\omega = 50.0°\sim 42.8°$ | | | |
|---|---|---|---|
| f: 35.7 mm–42.5 mm   FNO: 2.34–2.64 | | | |

| | r | d | nd | Vd |
|---|---|---|---|---|
| 1 | 99.862 | 3.24 | 1.834 | 37.2 |
| 2 | 555.313 | 0.20 | | |
| 3 | 76.097 | 1.65 | 1.487 | 70.2 |
| 4 | 26.057 | 7.29 | | |
| 5 | −64.814 | 1.50 | 1.535 | 60.1 |
| 6 | 44.723 | ( ) | | |
| 7 | 43.733 | 4.92 | 1.834 | 37.2 |
| 8 | −136.694 | 3.61 | | |
| 9 | 82.896 | 4.81 | 1.673 | 44.4 |
| 10 | −34.052 | 1.10 | 1.844 | 25.1 |
| 11 | −3601.855 | ( ) | | |
| 12 | 32.578 | 2.74 | 1.639 | 58.1 |
| 13 | −92.204 | ( ) | | |
| 14 | −124.064 | 0.85 | 1.548 | 52.1 |

-continued

Lens spec & data

| | | | | |
|---|---|---|---|---|
| 15 | 22.329 | 7.17 | | |
| 16 | −15.775 | 1.54 | 1.724 | 31.1 |
| 17 | 76.153 | 8.00 | 1.487 | 70.2 |
| 18 | −21.667 | 0.15 | | |
| 19 | −138.316 | 4.28 | 1.658 | 50.9 |
| 20 | −37.050 | ( ) | | |
| 21 | 66.146 | 6.40 | 1.744 | 44.8 |
| 22 | −86.275 | ( ) | | |
| 23 | inf. | 32.00 | 1.516 | 64.1 |
| 24 | inf. | 0.00 | | |
| 25 | inf. | 0.80 | 1.520 | 65.0 |
| 26 | inf. | 0.00 | | |
| 27 | inf. | 1.70 | 1.520 | 65.0 |
| 28 | inf. | 0.00 | | |
| 29 | inf. | 0.50 | 1.520 | 65.0 |
| 30 | inf. | | | | zoom data

| | W | T |
|---|---|---|
| d 6 | 11.86 | 5.80 |
| d11 | 14.09 | 15.57 |
| d13 | 1.59 | 4.37 |
| d20 | 0.50 | 2.30 |
| d22 | 5.00 | 5.00 |

Decenter & Tilt data

| | Y-Decenter | Y-Tilt |
|---|---|---|
| 14 | 0.00 | 0.01 |
| 15 | 0.00 | 0.01 |
| 21 | 0.00 | 0.03 |
| 22 | 0.00 | 0.03 |

$2\omega = 45.8°\sim 39.1°$ f: 36.8 mm–43.8 mm   FNO: 1.74–1.89

| | r | d | nd | Vd |
|---|---|---|---|---|
| 1 | 105.120 | 1.85 | 1.596 | 59.3 |
| 2 | 29.678 | 6.98 | | |
| 3 | −116.391 | 1.65 | 1.487 | 70.2 |
| 4 | 64.955 | 3.22 | | |
| 5 | 55.702 | 3.27 | 1.834 | 37.2 |
| 6 | 204.055 | ( ) | | |
| 7 | 91.452 | 4.26 | 1.772 | 49.6 |
| 8 | −98.093 | 0.15 | | |
| 9 | 53.428 | 4.01 | 1.772 | 49.6 |
| 10 | −1378.069 | 0.79 | | |
| 11 | −155.089 | 1.50 | 1.847 | 23.8 |
| 12 | 251.082 | ( ) | | |
| 13 | 65.396 | 3.19 | 1.697 | 55.5 |
| 14 | −69.039 | ( ) | | |
| 15 | −117.255 | 1.00 | 1.587 | 39.3 |
| 16 | 23.897 | ( ) | | |
| 17 | −17.199 | 1.54 | 1.710 | 29.5 |
| 18 | 93.433 | 8.69 | 1.487 | 70.2 |
| 19 | −24.699 | 0.15 | | |
| 20 | −1379.705 | 5.68 | 1.658 | 50.9 |
| 21 | −39.314 | ( ) | | |
| 22 | 73.157 | 6.03 | 1.744 | 44.8 |
| 23 | −120.125 | ( ) | | |
| 24 | inf. | 32.00 | 1.516 | 64.1 |
| 25 | inf. | 0.00 | | |
| 26 | inf. | 0.80 | 1.760 | 55.0 |
| 27 | inf. | 0.00 | | |
| 28 | inf. | 0.20 | 1.500 | 65.0 |
| 29 | inf. | 0.00 | | |
| 30 | inf. | 2.30 | 1.490 | 65.0 |
| 31 | inf. | | | |

-continued

Lens spec & data zoom data

| | W | T |
|---|---|---|
| d 6 | 12.31 | 2.76 |
| d12 | 13.64 | 14.24 |
| d14 | 1.25 | 1.96 |
| d16 | 9.03 | 9.84 |
| d21 | 0.50 | 7.93 |
| d23 | 4.80 | 4.80 |

Decenter & Tilt data

| | Y-Decenter | Y-Tilt |
|---|---|---|
| 9 | −0.21 | 0.00 |
| 10 | −0.21 | 0.00 |
| 15 | −0.16 | 0.00 |
| 16 | −0.16 | 0.00 |

$2\omega = 51.7°\sim 44.3°$ f: 36.9 mm–43.9 mm   FNO: 2.00–2.21

| | r | d | nd | Vd |
|---|---|---|---|---|
| 1 | 83.188 | 2.00 | 1.563 | 62.2 |
| 2 | 28.105 | 8.44 | | |
| 3 | −143.242 | 1.85 | 1.487 | 70.2 |
| 4 | 58.394 | 4.75 | | |
| 5 | 49.284 | 2.85 | 1.834 | 37.2 |
| 6 | 84.707 | ( ) | | |
| 7 | 66.763 | 4.83 | 1.772 | 49.6 |
| 8 | −161.832 | 1.42 | | |
| 9 | ( ) | 5.07 | 1.806 | 40.9 |
| 10 | −65.502 | 0.08 | | |
| 11 | −65.358 | 1.65 | 1.847 | 23.8 |
| 12 | −1529.555 | ( ) | | |
| 13 | 68.655 | 2.66 | 1.765 | 43.8 |
| 14 | −85.931 | ( ) | | |
| 15 | 2470.621 | 1.00 | 1.646 | 32.9 |
| 16 | 24.322 | 10.74 | | |
| 17 | −16.664 | 1.54 | 1.724 | 31.0 |
| 18 | 106.430 | 9.13 | 1.497 | 81.5 |
| 19 | −25.040 | 0.15 | | |
| 20 | −569.795 | 6.60 | 1.658 | 50.9 |
| 21 | −38.090 | ( ) | | |
| 22 | 86.032 | 6.88 | 1.744 | 44.8 |
| 23 | −111.369 | ( ) | | |
| 24 | inf. | 32.00 | 1.516 | 64.1 |
| 25 | inf. | 0.00 | | |
| 26 | inf. | 0.80 | 1.760 | 55.0 |
| 27 | inf. | 0.00 | | |
| 28 | inf. | 0.20 | 1.500 | 65.0 |
| 29 | inf. | 0.00 | | |
| 30 | inf. | 2.30 | 1.490 | 65.0 |
| 31 | inf. | | | | zoom data

| | W | T |
|---|---|---|
| d 6 | 11.85 | 2.91 |
| d12 | 15.96 | 15.99 |
| d14 | 1.07 | 2.38 |
| d21 | 0.50 | 8.09 |
| d23 | 8.00 | 8.00 | aspheric surface data

| | c(l/r) | k | A | B |
|---|---|---|---|---|
| 9 | 1.048e−02 | −2.375e+00 | −1.103e−06 | −2.327e−10 |

| | C | D | E |
|---|---|---|---|
| 9 | −3.348e−13 | −2.344e−15 | 0.000e+00 |

-continued

Lens spec & data

Decenter & Tilt data

| | Y-Decenter | Y-Tilt |
|---|---|---|
| 17 | 0.00 | 0.15 |
| 18 | 0.00 | 0.28 |
| 19 | 0.00 | 0.28 |
| 20 | 0.00 | 0.27 |
| 21 | 0.00 | 0.09 |

The embodiments of the present invention as described above succeeded in achieving the projection optical system capable of upwardly projecting the image information onto the screen while simplifying the entire apparatus and maintaining the high optical performance, and in achieving the projection apparatus using the projection optical system.

In the embodiment, it is described as an example that canter of image display element (liquid crystal panel) and center of projection surface are shifted in the gravitational or vertical direction with respect to the reference optical axis of the projection optical system. However, the scope to which the present invention is applied is not limited by such description, and the invention may by applied to the case of shifting centers in gravitational and/or horizontal direction (s). That is, canter of image display element and center of projection surface may be deviated in the horizontal direction with respect to the reference optical axis thereof, and in the gravitational and horizontal directions (i.e., tilted for the gravitational direction or for the horizontal direction). In such case, it is preferable in the projection optical system of the present invention that the direction along which the optical elements are deviated is substantially parallel to the direction along which the centers of the image display element and projection surface are deviated with respect to the reference optical axis of the projection optical system, and the direction along which the optical elements are tilted is substantially parallel to the direction along which the centers of the image display element and projection surface are deviated with respect to the reference optical axis of the projection optical system.

In addition, the embodiments of the present invention have permitted the correction for aberration by the decentering of the optical elements without use of such special means as to complicate the entire apparatus, and thus realized the high-resolution projection optical system in the smaller number of components than before. It is also feasible to readily construct the compact and lightweight projection optical system of the liquid crystal type, for example, with the fixed shift mechanism in the same configuration as before.

What is claimed is:

1. A projection optical system for magnifying and projecting image information formed on an image display element, onto a projection plane, comprising:
    a plurality of optical elements,
    wherein said image display element and said projection plane both are set substantially normal to a reference optical axis of said projection optical system,
    wherein an optical axis of at least one optical element out of said plurality of optical elements is shifted and/or tilted relative to said reference optical axis,
    wherein said image display element has a center shifted from the reference optical axis, and
    wherein the following condition is satisfied:

$0.45 < dya/Ya < 0.75$, where dya is a shift amount of the center of the image display element from the reference optical axis, and Ya an effective width of the image display element in the direction along which the center of said image display element is shifted with respect to the reference optical axis.

2. A projection apparatus comprising: the projection optical system according to claim 1; and an illumination optical system for illuminating said image display element with light from a light source.

3. The projection optical system according to claim 1, further comprising a color combining system provided at a side of said image display element with respect to said plurality of optical elements.

4. A projection optical system for magnifying and projecting image information formed on an image display element, onto a projection plane, comprising:
    a plurality of optical elements,
    wherein said image display element and said projection plane both are set substantially normal to a reference optical axis of said projection optical system,
    wherein an optical axis of at least one optical element out of said plurality of optical elements is shifted and/or tilted relative to said reference optical axis,
    wherein said image display element has a center shifted from the reference optical axis, and
    wherein the following condition is satisfied:

$0.45 < dya/Ya < 0.75$, where dya is a deviation amount of the center of the image display element from the reference optical axis in a direction of gravity, and Ya an effective width of the image display element in the direction of gravity.

5. A projection apparatus comprising: the projection optical system according to claim 4; and an illumination optical system for illuminating said image display element with light from a light source.

6. The projection optical system according to claim 4, further comprising a color combining system provided at a side of said image display element with respect to said plurality of optical elements.

7. A projection optical system for magnifying and projecting image information formed on an image display element, onto a projection plane, comprising:
    a plurality of optical elements,
    wherein said image display element and said projection plane both are set substantially normal to a reference optical axis of said projection optical system,
    wherein said image display element has a center shifted from said reference optical axis, and
    wherein optical axis of at least one optical element out of said plurality of optical elements is shifted and/or tilted relative to said reference optical axis,
    wherein said projection optical system further comprising a plurality of optical units, wherein two or more units out of said plurality of optical units are moved along said reference optical axis to continuously vary projection magnification.

8. A system according to claim 7, wherein two units at the extremes on the magnification side and on the reduction side out of the plurality of optical units are fixed during a zoom operation.

9. A projection apparatus comprising: the projection optical system according to claim 7; and an illumination optical system for illuminating said image display element with light from a light source.

10. The projection optical system according to claim 7, further comprising a color combining system provided at a side of said image display element with respect to said plurality of optical elements.

11. A projection optical system for magnifying and projecting image information formed on an image display element, onto a projection plane, comprising:
a plurality of optical elements,
wherein said image display element and said projection plane both are set substantially normal to a reference optical axis of said projection optical system,
wherein said image display element has a center shifted from said reference optical axis, and
wherein optical axis of at least one optical element out of said plurality of optical elements is shifted and/or tilted relative to said reference optical axis,
wherein said projection optical system further comprising a plurality of optical units, wherein an optical unit located at the extreme on the magnification side in said projection optical system is moved along the reference optical axis to implement adjustment of focus.

12. A projection apparatus comprising: the projection optical system according to claim 11; and an illumination optical system for illuminating said image display element with light from a light source.

13. The projection optical system according to claim 11, further comprising a color combining system provided at a side of said image display element with respect to said plurality of optical elements.

14. A projection optical system for magnifying and projecting image information formed on an image display element, onto a projection plane, comprising in the order named from the magnification side of said system:
a first lens unit with a negative refracting power;
a second lens unit with a positive refracting power;
a third lens unit with a positive refracting power;
a fourth lens unit with a negative refracting power; and
a fifth lens unit with a positive refracting power, wherein
said image display element and said projection plane are set substantially normal to a reference optical axis of said projection optical system,
said image display element has a center shifted from said reference optical axis,
two or more lens units are moved during a zoom operation,
said first lens unit and said fifth lens unit are fixed during the zoom operation,
said second lens unit comprises a lens with a positive refracting power and a lens with a negative refracting power, and
each of said lenses in said second lens unit has an optical axis shifter from the reference optical axis in a direction of gravity.

15. A projection apparatus comprising: the projection optical system according to claim 14; and an illumination optical system for illuminating said image display element with light from a light source.

16. The projection optical system according to claim 14, further comprising a color combining system provided at a side of said image display element with respect to said plurality of optical elements.

17. A projection optical system for magnifying and projecting image information formed on an image display element, onto a projection plane, comprising in the order named from the magnification side of said system:
a first lens unit with a negative refracting power;
a second lens unit with a positive refracting power;
a third lens unit with a positive refracting power;
a fourth lens unit with a negative refracting power; and
a fifth lens unit with a positive refracting power, wherein
said image display element and said projection plane are set substantially normal to a reference optical axis of said projection optical system,
said image display element has a center shifted from said reference optical axis,
two or more lens units are moved during a zoom operation,
said first lens unit and said fifth lens unit are fixed during the zoom operation,
said fourth lens unit comprises a lens with a negative refracting power,
said fifth lens unit comprises a lens with a positive refracting power, and
each of said negative lens in said fourth lens unit and said positive lens in said fifth lens unit has an optical axis tilted relative to the reference optical as is.

18. A projection apparatus comprising:
a projection optical system according to claim 17, and
an illumination optical system for illuminating said image display element with light from a light source.

19. A projection optical system for magnifying and projecting image information formed on an image display element, onto a projection plane, comprising in the order named from the magnification side of said system:
a first lens unit with a negative refracting power;
a second lens unit with a positive refracting power;
a third lens unit with a positive refracting power;
a fourth lens unit with a negative refracting power;
a fifth lens unit with a positive refracting power; and
a sixth lens unit with a positive refracting power, wherein
said image display element and said projection plane are set substantially normal to a reference optical axis of said projection optical system,
said image display element has a center shifted from said reference optical axis,
two or more lens units are moved during a zoom operation,
said first lens unit and said sixth lens unit are fixed during the zoom operation,
said second lens unit comprises a lens with a positive refracting power,
said fourth lens unit comprises a lens with a negative refracting power, and
each of said positive lens in said second lens unit and said negative lens in said fourth lens unit has an optical axis tilted relative to the reference optical axis,
each of said lenses has an optical axis shifted from the reference optical axis in a direction of gravity.

20. A projection apparatus comprising:
a projection optical system according to claim 19, and
an illumination optical system for illuminating said image display element with light from a light source.

21. A projection optical system for magnifying and projecting image information formed on an image display element, onto a projection plane, comprising in the order named from the magnification side of said system:
a first lens unit with a negative refracting power;
a second lens unit with a positive refracting power;
a third lens unit with a positive refracting power;

a fourth lens unit with a negative refracting power; and a fifth lens unit with a positive refracting power, wherein said image display element and said projection plane are set substantially normal to a reference optical axis of said projection optical system, said image display element has a center shifted from said reference optical axis, two or more lens units are moved during a zoom operation, said first lens unit and said fifth lens unit are fixed during the zoom operation, said fourth lens unit comprises lenses each with a negative, a positive, and a positive refracting power, and each of said negative lens and positive lenses in said fourth lens unit has an optical axis tilted relative to the reference optical axis of the projection optical system.

22. A projection apparatus comprising:

a projection optical system according to claim 21, and an illumination optical system for illuminating said image display element with light from a light source.

* * * * *

UNITED STATES PATENT AND TRADEMARK OFFICE
CERTIFICATE OF CORRECTION

PATENT NO. : 7,009,776 B2
APPLICATION NO. : 10/288315
DATED : March 7, 2006
INVENTOR(S) : Wada Page 1 of 1

It is certified that error appears in the above-identified patent and that said Letters Patent is hereby corrected as shown below:

In the Claim:

In claim 14 (col. 17, line 56), please replace "shifter" with --shifted--.

In claim 17 (col. 18, line 23), please replace "as is" with --axis--.

Signed and Sealed this

Sixth Day of March, 2007

JON W. DUDAS
*Director of the United States Patent and Trademark Office*